United States Patent Office 3,695,845
Patented Oct. 3, 1972

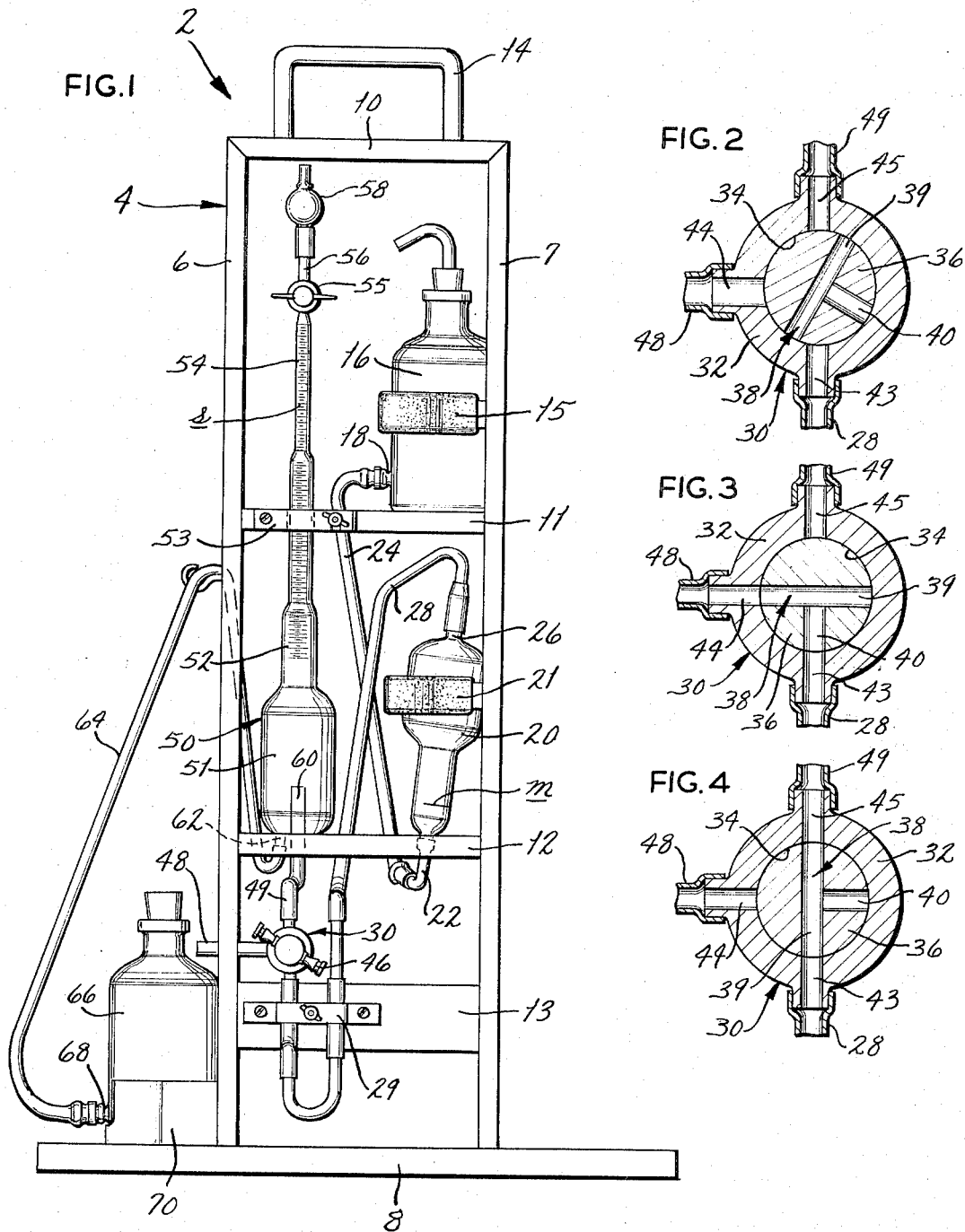

3,695,845
APPARATUS AND PROCESS FOR MEASURING THE AMOUNT OF AIR IN GASEOUS MIXTURES OF CARBON DIOXIDE AND AIR
Martin C. Watz, Worthington, Ohio, assignor to Anheuser-Busch, Incorporated, St. Louis, Mo.
Filed Oct. 6, 1970, Ser. No. 78,511
Int. Cl. G01n 31/06
U.S. Cl. 23—232 R                                    18 Claims

ABSTRACT OF THE DISCLOSURE

The amount of air in a gaseous mixture of carbon dioxide and air is determined by filling a calibrated vessel or burette with a potassium hydroxide solution and similarly filling a reservoir of known volume with water. Then the gaseous mixture is introduced into the reservoir, displacing the water therefrom, until the mixture occupies the known volume of the reservoir. The water so displaced, however, maintains the gaseous mixture under pressure and when a valve which is disposed between the reservoir and the vessel is turned, the displaced water forces the known volume of the gaseous mixture into the vessel, causing the mixture to bubble into the potassium hydroxide solution therein. As the gaseous mixture bubbles into the potassium hydroxide solution, the carbon dioxide is absorbed while the air passes completely through the solution and collects above it in the upper end of the calibrated vessel. By comparing the volume of air collected in the vessel with the volume of the gaseous mixture initially in the reservoir, it is possible to ascertain the purity of the carbon dioxide mixture.

BACKGROUND OF THE INVENTION

This invention relates to measuring devices and procedures and more particularly to an apparatus and a process for measuring the amount of a seelcted gas in a gaseous mixture.

In the brewing industry it is necessary to purge air from the large beer tanks at the outset of the fermentation process which occurs in those tanks, since the oxygen in air has a detrimental effect on the process. To purge the air pure carbon dioxide gas is introduced into the tank. The carbon dioxide, of course, displaces the air and the purity of the carbon dioxide in the tank at anytime serves as an indication of the amount of air present in the tank. Accordingly, at periodic intervals during the fermentation process the purity of the carbon dioxide gas in the beer tank is checked to insure that the amount of air within the tank does not exceed prescribed levels.

Currently, the purity of carbon dioxide gas derived from beer tanks is tested by passing the gas through a caustic solution of potassium hydroxide. The potassium hydroxide absorbs the carbon dioxide while the air bubbles through it. After bubbling through the solution the air is collected and measured. While the basic process seems simple, the apparatus heretofore developed for employing the process have indeed been complex and difficult to operate. For example, the most common device currently employed to measure the purity of carbon dioxide includes two burettes, two leveling bottles, a gas pipette provided with a bubbling tube, and a complex network of tubes and valves connecting the burettes, leveling bottles and pipette. Indeed, a minimum of four valves are employed and during the measuring operation these valves must be manipulated many times. Moreover, one of the leveling bottles must be raised and lowered several times, thereby adding to the complexity of the measuring procedure. By reason of the complexity of the process and apparatus currently employed to measure the purity of carbon dioxide in beer tanks, the measuring process consumes considerable time and must be conducted by skilled personnel.

SUMMARY OF THE INVENTION

One of the principal objects of the present invention is to provide a process and apparatus for quickly ascertaining the amount of air in a gaseous mixture of carbon dioxide and air. Another object is to provide an apparatus of the type stated which is simple in construction and inexpensive to manufacture. A further object is to provide an apparatus of the type stated which is easy to operate and does not require highly skilled personnel to do so. An additional object is to provide a process and apparatus which enables one to easily and quickly determine the purity of carbon dioxide gas in beer tanks.

The present invention is embodied in an apparatus including a vessel, a reservoir of known volume, a filling tube, and a valve connected between the tube, vessel and reservoir. The vessel is filled with a solution capable of absorbing a component of a gaseous mixture. The gaseous mixture to be tested is passed through filling tube and valve to the reservoir until a known volume is in the reservoir. The valve is then turned to divert the known volume of the gaseous mixture into the vessel where the component in it is absorbed and the remainder collects above the solution. The volume of the remainder so collected is compared with the volume of the mixture introduced into the vessel. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a front elevational view of a testing apparatus constructed in accordance with and embodying the present invention;

FIG. 2 is a sectional view showing the T-shaped passageway of the three-way valve forming part of the present invention, the valve being in its closed position;

FIG. 3 is a sectional view similar to FIG. 2, but showing the valve in one of its open positions; and FIG. 4 is a sectional view similar to FIGS. 2 and 3, but showing the valve in another of its open positions.

DETAILED DESCRIPTION

Referring now in detail to the drawings, 2 designates an apparatus for testing the purity of carbon dioxide gas derived from a fermentation tank used for brewing beer. The apparatus 2 includes a supporting framework 4 comprising a pair of upstanding members 6 and 7, a base 8 to which the upstanding members 6 and 7 are attached, and four cross members 10, 11, 12 and 13 extending between the upstanding members 6 and 7. The uppermost cross member 10 has a handle 14 attached to it. The next cross member 11 resembles a shelf, and likewise so does the cross member 12 immediately below it. The lowermost cross member is oriented with its large flat face presented vertically.

Resting on the shelf-like cross member 11 and fastened against the upstanding member 7 by a U-shaped bracket 15 is a water container 16 having a discharge port 18 at its lower end. Actually, the container 16 is a leveling bottle. Immediately below the container 16 a measuring bulb or reservoir 20 is supported on the shelf-like cross member 12, and this bulb 20 is likewise fastened to the upstanding member 7 by a U-shaped bracket 21. Near its lower end the reservoir 20 is provided with a calibration mark $m$. The reservoir 20 has an inlet 22 at its lower end, and that inlet 22 projects through the cross member 12 and below the member 12 is connected by means of tubing 24 to the discharge port 18 of the water container 16. At its upper end the reservoir 20 is provided with an outlet 26 to which a glass or other transparent flow line 28 is connected. The transparent line 28 extends downwardly in front of the cross member 13 and then doubles back upon itself, and this doubled back or U-shaped portion is attached to the cross member 13 by a clamp-type bracket 29.

Above the cross member 13 and beyond the U-shaped bend, the flow line 28 empties into a three-way valve 30 including (FIG. 2) a valve body 32 having a bore 34 into which a cylindrical valve element 36 is fitted. The valve element 36 rotates within the bore 34 and is provided with a T-shaped passageway 38 or so-called T-bore, which includes a diametral branch 39 extending through the center and opening outwardly from both sides of the element 36. In addition to the diametral branch 39, the passageway 38 also includes a radial branch 40 which intersects the diametral branch 39 at the center of the element 36 and opens outwardly of the element 36 at its opposite end midway between the ends of the diametral branch 39. The radial branch 40 is positioned perpendicularly with respect to the diametral branch 39, and the outer ends of both the branches 39 and 40 are in circumferential alignment. The valve body 32 is further provided with three ports 43, 44, and 45 which open into the bore 34 where they are also in circumferential alignment. The inner ends of the ports 43 and 45 are located 180° apart, whereas the inner end of the port 44 is disposed between the ports 43 and 45 located 90° from each of them. The valve element 36 is further provided with an exposed handle 46 (FIG. 1) for rotating it.

The port 43 is connected to the transparent line 28 leading from the outlet 26 of the measuring reservoir 20, and the volume of both the port 43 and the line 28 are considered in the calibration of the reservoir 12. In particular, the space defined by the port 43, the line 28 and the portion of the reservoir 20 above the calibration mark m equals a known volume and indeed constitutes a reservoir of known volume. Preferably, this volume equals 100 ml.

The port 44, on the other hand, is connected with a rigid filling tube 48 which projects through the upstanding frame member 6 and terminates shortly beyond it. Finally, the port 45 empties into a transfer tube 49 which in turn connects to a burette 50 mounted on the frame 4.

The burette 50 comprises a glass vessel which at its lower end rests upon the cross member 12 and at its upper end is confined by the cross member 11. The burette 50 includes an enlarged or bulbous lower end 51 which opens into successively reduced center sections 52, each of which is calibrated, and the last of these center sections 52 fits into a forwardly opening cutout in the cross member 11. This cutout is normally covered by a retaining plate 53, thus confining the upper end of the burette 50 to the cutout. The upper center section 52 furthermore merges into a calibrated neck 54 which is fitted with a stop cock 55 having an outlet 56 leading therefrom, and connected with the outlet 56 is a caustic trap 58. The neck 54 is calibrated so that the volume between the stop cock 55 and any selected point on the neck 54 can be ascertained. To this end a scale s is etched in the neck 54 as well as in the center sections 52. Since the neck 54 is smaller in diameter than the center sections 52 the calibration marks of the scale s are spaced further apart on it for equal increments of volume than they are on the center sections 52, and consequently the burette 50 is more accurately read when the liquid level extends into the neck 54. If the volume of the reservoir 20 and the associated line 28 and port 43 equals 100 ml., then the scale s should be graduated in milliliters.

The bulbous lower end 51 of the burette 50 has a glass bubbling tube 60 projecting upwardly for a short distance into its interior. This tube 60 continues downwardly through the cross member 12, and at its lower end is joined to the transfer tube 49 which in turn is connected to the port 45 of the valve 30. The bulbous lower end 51 is further provided with a port 62, and attached to that port 62 is a flexible tube 64 which leads to a leveling bottle 66 and, in particular, to a port 68 at the bottom of the bottle 66. The bottle 66 rests upon the flat base 8 in a cup-like receptacle 70, from which it may be removed and elevated to a position above the stop cock 55 at the upper end of the burette 50.

To prepare the testing apparatus 2 for use, the valve 30 is first closed by rotating its valve element 36 to a closed position (FIG. 2) wherein the radial branch 40 of the T-shaped passageway 38 is presented in a 4 o'clock position, in which case the valve element 36 blocks all three ports 43, 44 and 45 in the valve body 32. Next, distilled water is introduced into the container 16 until the container 16 is almost full. Some of the water will flow through the tubing 24 and into the reservoir 20, partially filling the same. The leveling bottle 66, on the other hand, is filled with a 50% potassium hydroxide solution, and to impart a slight color to this solution so that it is readily discernible in the burette 50, a small amount of sodium chromate may be dissolved in it.

Once the container 16 and the leveling bottle 66 are filled respectively with water and potassium hydroxide solution, the valve element 36 is rotated clockwise to bring the radial branch 40 of the T-shaped passageway 38 to a 6 o'clock position (FIG. 3), and this places the valve ports 43 and 44 in communication through the passageway 38. Consequently, air trapped in the flow line 28 and reservoir 20 escapes through filling tube 48, its place being taken by the water from the container 16. When all air is purged from the reservoir 20, the transparent line 28, and the port 43, as indicated by the continuous flow of water from the rigid filling tube 48, the valve element 36 is rotated counterclockwise until the radial branch 40 of the passageway 38 is at 3 o'clock (FIG. 4). This places the valve ports 43 and 45 in communication and likewise the transparent line 28 and the bubbling tube 60 of the burette 50. After about 3 to 5 ml. of water flows from the bubbling tube 50 into lower or bulbous end 51 of the burette 50, the valve element 36 is returned to its closed position by turning the handle 45 clockwise until the radial branch 40 of the passageway 38 assumes the 4 o'clock position (FIG. 2).

Next, the stop cock 55 at the upper end of the burette 50 is opened and the leveling bottle 66 is elevated sufficiently to enable the potassuim hydroxide solution in it to flow into and completely fill the burette 50. The potassium hydroxide displaces the air from the burette 50 and the air so displaced escapes through the open stop cock 55 and the caustic trap 58. When the level of the potassium hydroxide solution reaches the stop cock 55, the stop cock 55 is closed and the leveling bottle 66 is returned to its receptacle 70. Consequently, only the caustic solution remains in the burette 50, air being completely excluded therefrom.

The testing apparatus 2 is now in condition to measure the purity of carbon dioxide derived from beer tanks or for that matter from any other source of the gas. More particularly, the apparatus is in condition to measure the amount of air contained in the gaseous mixture of carbon dioxide and air.

To measure the purity of the carbon dioxide in a beer tank, a flexible hose (not shown) is attached to the swickel or spigot of the beer tank and the spigot is opened slightly to enable the carbon dioxide from the tank to displace the air in the hose. Once the hose is purged of air it is connected to the rigid filling tube 48 leading to the valve 30 so that the hose serves as a conduit between the beer tank or other source of carbon dioxide and the testing apparatus 2.

Next the valve element 36 is turned clockwise until the radial branch 40 of the passageway 38 assumes a 6 o'clock position (FIG. 3), in which case the valve ports 43 and 44 wil be in communication and the gas from the beer tank ($CO_2$ and air) will flow into the tubing 28 and measuring reservoir 20. The gas is allowed to flow into the reservoir 20 until the water level in the reservoir 20 reaches the calibration mark m, indicating that 100 ml. of gas are in the reservoir 20, the transparent line 28, and the valve port 43. At this point the valve element 36 is rotated counterclockwise until the radial branch 40 of the passageway 38 comes into the 3 o'clock position (FIG. 4).

When the radial branch 40 of the passageway 38 reaches the 3 o'clock position the ports 43 and 45 are in communication through the passageway 38, whereas the port 44 is blocked. This enables the gaseous mixture or carbon dioxide formerly entrapped in the measuring reservoir 20 to enter the burette 50 through the bubbling tube 60 and to bubble through the potassium hydroxide solution. Indeed, the distilled water from the container 16 displaces the gas from the reservoir 20 and forces it through the line 28. The valve element 36 should remain in the foregoing 3 o'clock position until approximately ½ to 1 ml. of water flows into the burette 50, at which time the valve element 36 is moved to its closed position, that is the position in which the radial branch 40 is presented at 4 o'clock (FIG. 2). Allowing a small amount of water to enter the burette 50 insures that all of the gas is displaced from the line 28, the valve 30, the tube 49, and the bubbling tube 60.

As the gas from the reservoir 20 bubbles through the potassium hydroxide solution the carbon dioxide is absorbed by the solution, while any air mixed with that carbon dioxide in the gas passes on through the solution and becomes entrapped in the upper end of the burette neck 54. To achieve complete absorption of the carbon dioxide the entire apparatus 2 should be grasped by the handle 14 and gently rocked back and forth several times.

Since the air passes completely through the potassium hydroxide solution without being absorbed, it will occupy a portion of the burette 50, as previously noted. The volume of the neck 54 which is so occupied may be read from the graduated scale s, and that volume equals the volume of air within 100 ml. of the tested carbon dioxide gas. Assuming that the scale s is graduated in milliliters, the numerical reading derived from the scale s also equals the volumetric percentage of air in the carbon dioxide gas, since the test is conducted on 100 ml. basis.

When the level of the potassium hydroxide solution in the burette 50 is read to ascertain the volume of air separated from the gaseous mixture of carbon dioxide and air, the leveling bottle 66 containing the potassium hydroxide solution should be elevated to the level which the water in the container 16 seeks when the reservoir 20 is charged with 100 milliliters of carbon dioxide. This places the carbon dioxide gas in the reservoir 20 and the entrapped air in the burette 50 under the same pressure so that the accuracy of the volumetric comparison is not in any way impaired by difference in pressure.

In order to prepare the testing apparatus 2 for another measurement, the valve element 36 is rotated counterclockwise until the radial branch 40 of the passageway 38 is in the 6 o'clock position (FIG. 3). This causes water to flow from the reservoir 20 into the rigid filling tube 48, and that water displaces the air in the tube 48. Then the valve element 36 is closed and the transfer hose leading from the beer tank is again attached to the filling tube 48. The remaining steps for the subsequent measurement are as previously described.

This invention is intended to cover all changes and modifications of the example of the invention herein chosen for purposes of the disclosure which do not constitute departures from the spirit and scope of the invention.

I claim:

1. A process of measuring the amount of air in a gaseous mixture of carbon dioxide and air; said method comprising filling a reservoir of known volume with a liquid which does not absorb the gaseous mixture; displacing the liquid from the reservoir with the gaseous mixture until the gaseous mixture occupies the known volume in the reservoir; filling a calibrated vessel with a solution capable of absorbing the carbon dioxide but not the air; introducing the gaseous mixture into the vessel filled with the solution, and collecting the air in the vessel above the solution therein.

2. A process according to claim 1 and further characterized by venting the upper end of the vessel as the solution is introduced into it whereby all air is purged from the vessel.

3. A process according to claim 2 wherein the gaseous mixture is introduced into the upper end of the reservoir, and the liquid displaced from the reservoir by the gaseous mixture leaves the lower end of the reservoir but is maintained under pressure by a column of liquid rising to a height higher than the reservoir whereby the gaseous mixture is maintained under continuous pressure.

4. A process according to claim 3 wherein the solution is introduced into the vessel by filling a leveling bottle with the solution, connecting the lower end of the leveling bottle with the lower end of the vessel through a flexible hose, and elevating the leveling bottle to a position in which the level of the solution is higher than the top of the vessel.

5. A process according to claim 3 wherein the solution is a potassium hydroxide solution and the liquid is water.

6. A process for isolating a component of a gaseous mixture; said process comprising forcing the gaseous mixture into a reservoir containing a pressurizing liquid which does not absorb the gaseous mixture such that the gaseous mixture forceably displaces at least some of the pressurizing liquid from the reservoir; maintaining the gaseous mixture in the reservoir under pressure with the displaced pressurizing liquid, using the displaced pressurizing liquid to force the gaseous mixture into the bottom of an upright vessel having a closed top and containing an absorption liquid which is incapable of absorbing the component but is capable of absorbing the remainder of the gaseous mixture, whereby the component will bubble completely through the absorption liquid and the remainder of the gaseous mixture will be absorbed by the absorption liquid; forcing the pressurizing liquid substantially all the way to the absorption liquid so that all of the gaseous mixture from the reservoir is forced into the absorption liquid, and collecting the component above the absorption liquid.

7. A process according to claim 6 and further characterized by forcing some of the pressurizing liquid into the absorption liquid to insure that all of the gaseous mixture from the reservoir passes into the absorption liquid.

8. A process according to claim 6 wherein the gaseous mixture is forced into the reservoir through a filling tube; and wherein the process is further characterized by passing some of the pressurizing liquid through and discharging it from the filling tube to substantially purge the filling tube of other gases prior to forcing the gaseous mixture into it.

9. An apparatus for determining the amount of carbon dioxide in a gaseous mixture of carbon dioxide and air; said apparatus comprising a calibrated vessel mounted in an upright position and having its upper end normally closed, the vessel being calibrated near its upper end; a reservoir of known volume; a filling tube connectable with a source of the gaseous mixture to be tested; a valve having ports connected with the filling tube, the reservoir, and the vessel, the valve being capable of blocking the ports connected with vessel and reservoir, of placing the reservoir and tube in communication, or of placing the reservoir and the calibrated vessel in communication; means for supplying a liquid under pressure to the reservoir for forcing fluid therein toward the valve, and means for introducing into the vessel a solution which will absorb the carbon dioxide but not air, whereby through manipulation of the valve a known quantity of the gaseous mixture is introduced into the reservoir and thereafter passed through the solution in the vessel under the pressure exerted by the pressurized liquid, so that the carbon dioxide will be absorbed by the solution but the air will pass on through it and collect in the upper part of the vessel where the volume of the air may be measured against the calibrations.

10. An apparatus according to claim 9 wherein a second valve is connected to the vessel for venting the upper end thereof as the solution is introduced into the vessel.

11. An apparatus according to claim 10 wherein the solution is introduced into the vessel at the bottom of the vessel.

12. An apparatus according to claim 11 wherein the means for introducing the solution into the vessel comprises a leveling bottle, and a flexible hose connected between the lower end of the bottle and the lower end of the vessel; and wherein the bottle may be elevated to bring the level of solution in it above the upper end of the vessel whereby the vessel is completely filled with solution.

13. An apparatus according to claim 10 wherein the upper end of the reservoir is connected with the valve and the lower end of the reservoir is connected to the source of liquid.

14. An apparatus according to claim 13 wherein the source of liquid is a container of the liquid positioned above the reservoir and having its lower end connected with the reservoir so that liquid will flow under pressure from the container to the reservoir.

15. An apparatus according to claim 14 wherein the volume of the reservoir equals 100 of the units in which the vessel is calibrated whereby the reading derived from the calibrations on the vessel will equal the volumetric percentage of air in the gaseous mixture.

16. An apparatus for detecting the presence of a selected gas within a gaseous mixture, said apparatus comprising: a vessel for holding a solution which will not absorb the selected gas but will absorb the remainder of the gaseous mixture, the vessel being mounted in an upright position and having its upper end normally closed; a reservoir of known volume for holding a pressurizing liquid which will not absorb the gaseous mixture; container means connected with the lower end of the reservoir for holding at least a portion of the pressurizing liquid at an elevation higher than the reservoir to pressurize the pressurizing liquid in the reservoir, the container means further being positioned to hold a portion of the pressurizing liquid always higher than the lower end of the vessel; a filling line connected with a pressurized source of the gaseous mixture; a valve connected with the upper end of the reservoir, with the filling line, and with only the lower end of the vessel so that the valve at all times communicates with only the lower end of the vessel and not the upper end thereof, the valve being capable of forming a blockage between the vessel, reservoir, and filling line, of placing the filling line in communication with the reservoir, and of placing the upper end of the reservoir in communication with the lower end of the vessel but not in communication with the upper end of the vessel, whereby through manipulation of the valve the pressurized gaseous fluid is allowed to flow into the reservoir and collect therein until a known volume of the fluid is within the apparatus, and thereafter the known volume of fluid is introduced into the lower end of the vessel and passed through the solution under the pressure exerted by the pressurizing liquid so that the selected gas bubbles through the solution to be collected in the upper end of the vessel and the remainder of the gaseous mixture is absorbed by the solution.

17. An apparatus according to claim 16 wherein the container means for holding the pressurizing liquid is mounted generally above the reservoir in a position which is fixed with respect to the reservoir.

18. An apparatus according to claim 16 wherein another valve is connected to the upper end of the vessel for venting the vessel at the upper end thereof, the other valve being operable externally of the vessel, and further being insensitive to pressure on each side of it whereby its operation is not affected by pressure differentials across it.

References Cited
UNITED STATES PATENTS 2,526,337  10/1950  Dietert _____ 23—254 R MORRIS O. WOLK, Primary Examiner R. M. REESE, Assistant Examiner U.S. Cl. X.R.

23—254 R